J. H. DEAN.
VOTING MACHINE.
APPLICATION FILED JUNE 20, 1910.

1,073,407.

Patented Sept. 16, 1913.
12 SHEETS—SHEET 1.

WITNESSES

INVENTOR
James H. Dean
BY Peirce & Fischer
ATTORNEYS.

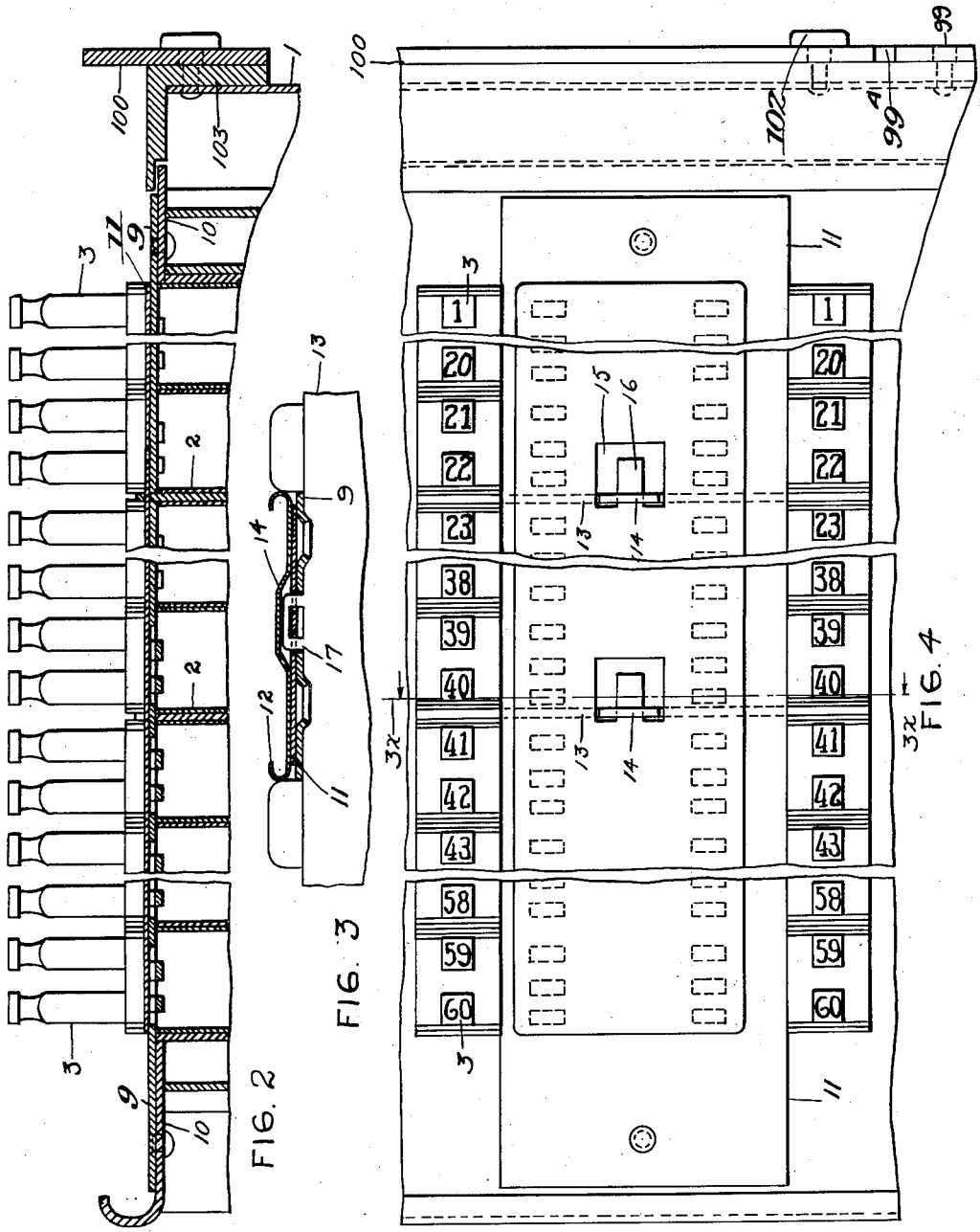

J. H. DEAN.
VOTING MACHINE.
APPLICATION FILED JUNE 20, 1910.
1,073,407.
Patented Sept. 16, 1913.
12 SHEETS—SHEET 3.
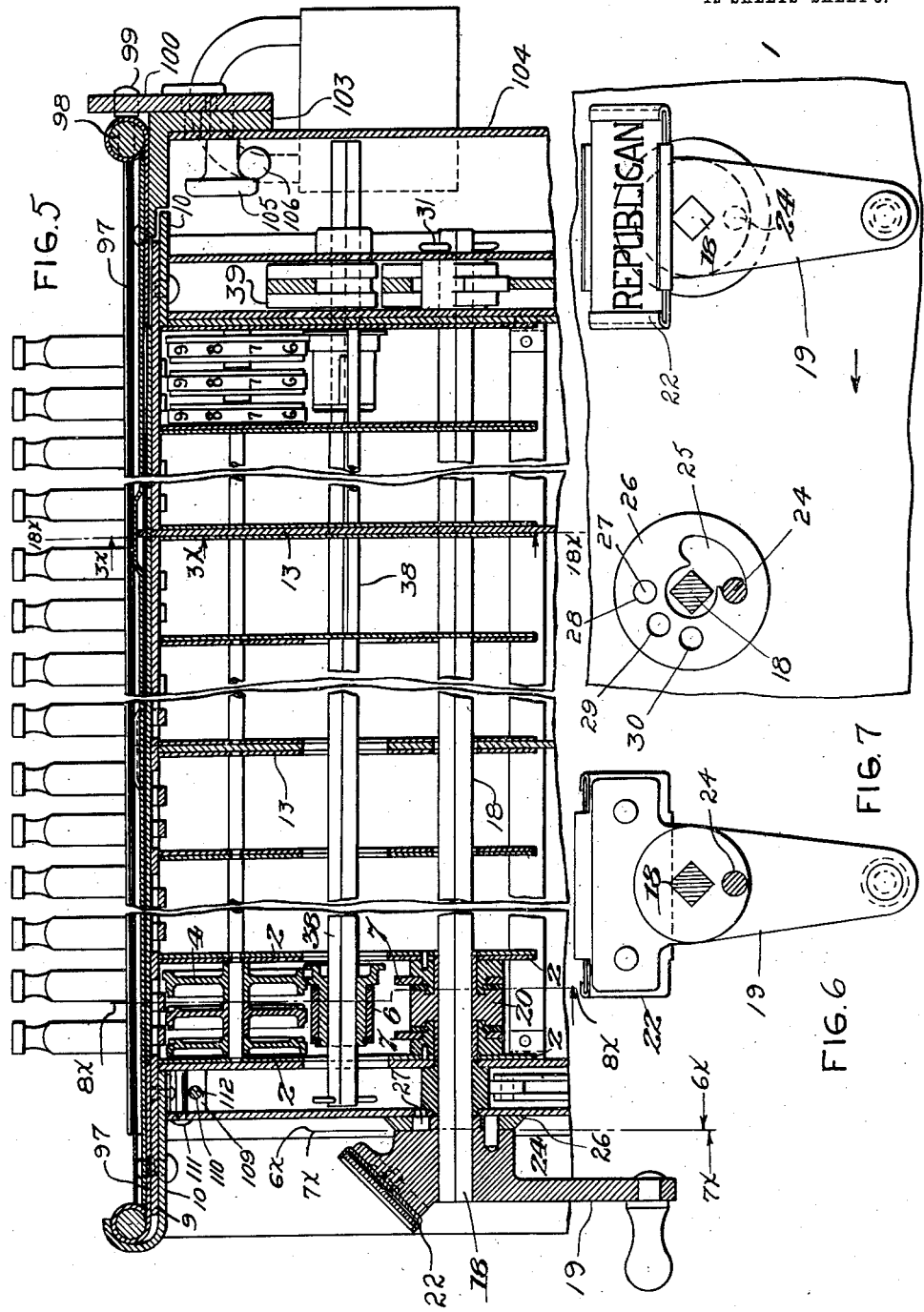
WITNESSES
INVENTOR
James H. Dean
BY Peirce & Fisher
ATTORNEYS.

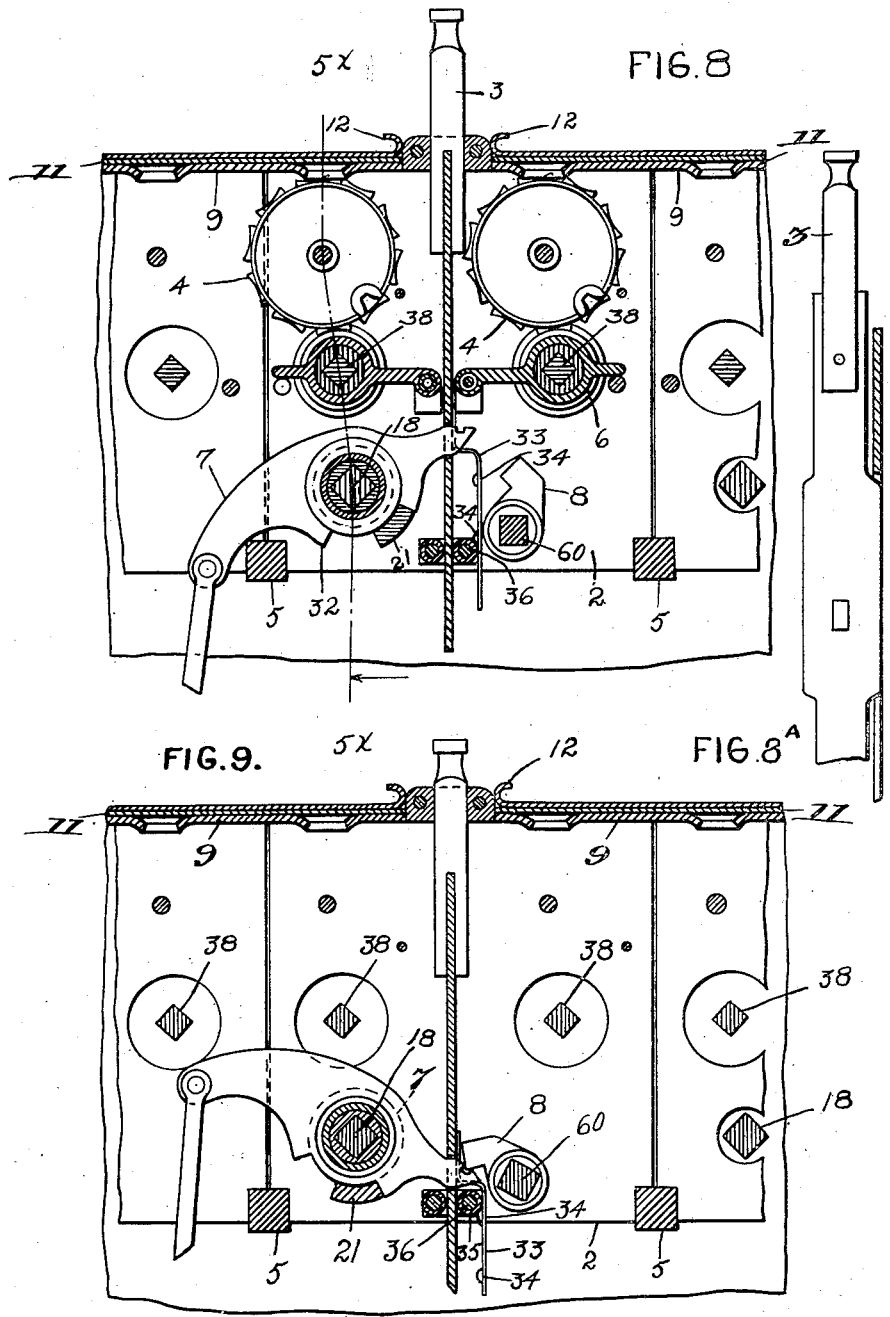

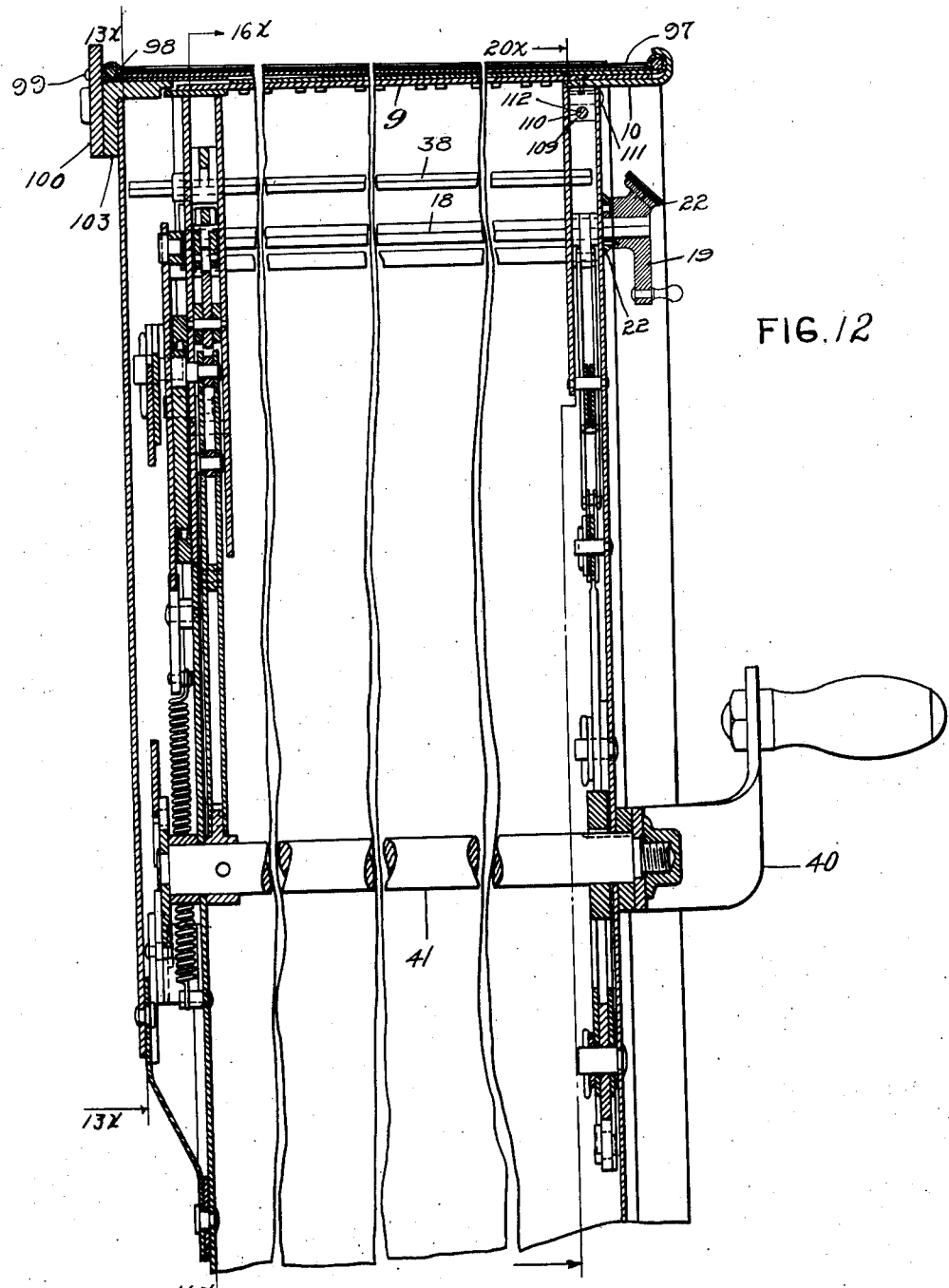

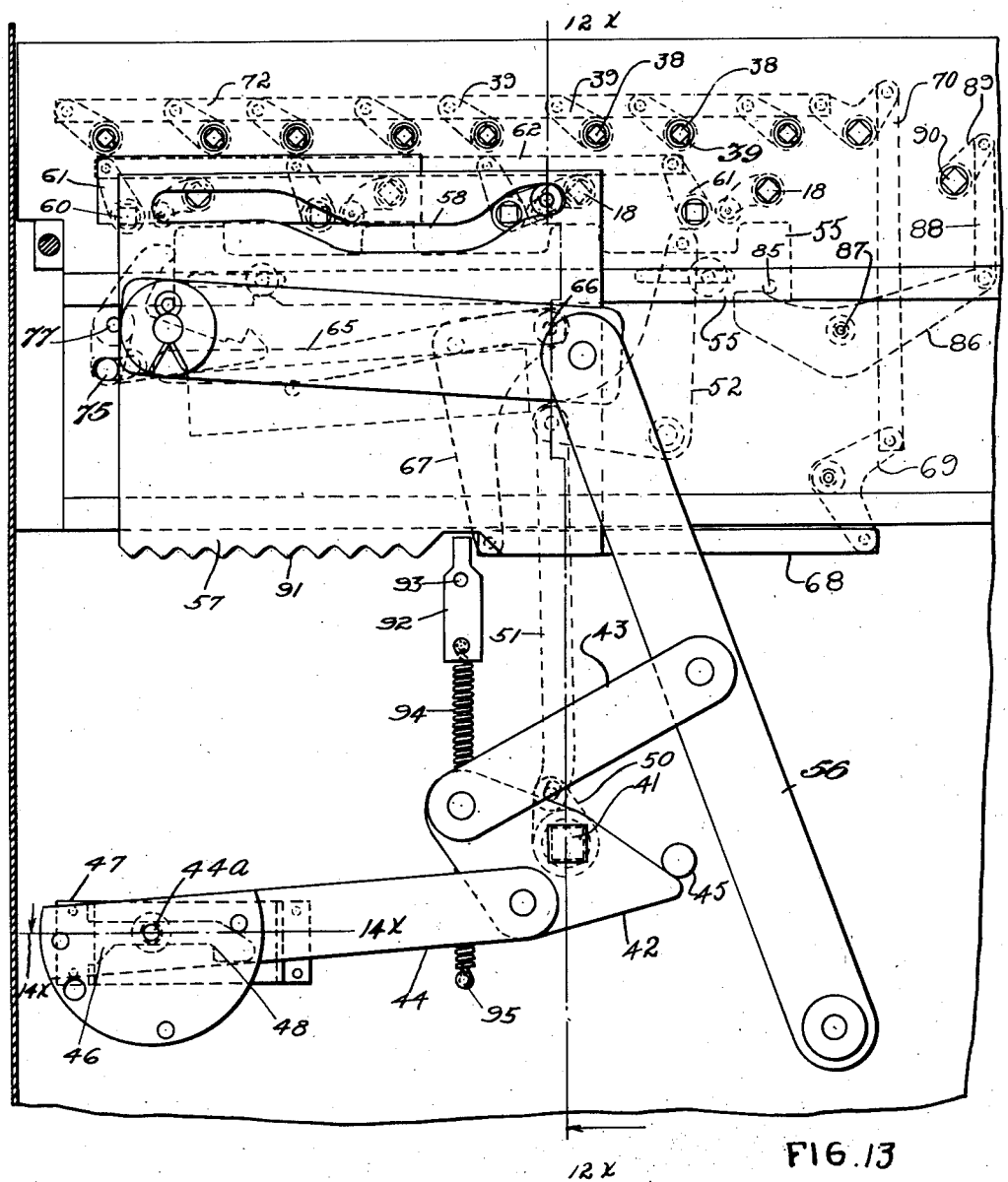

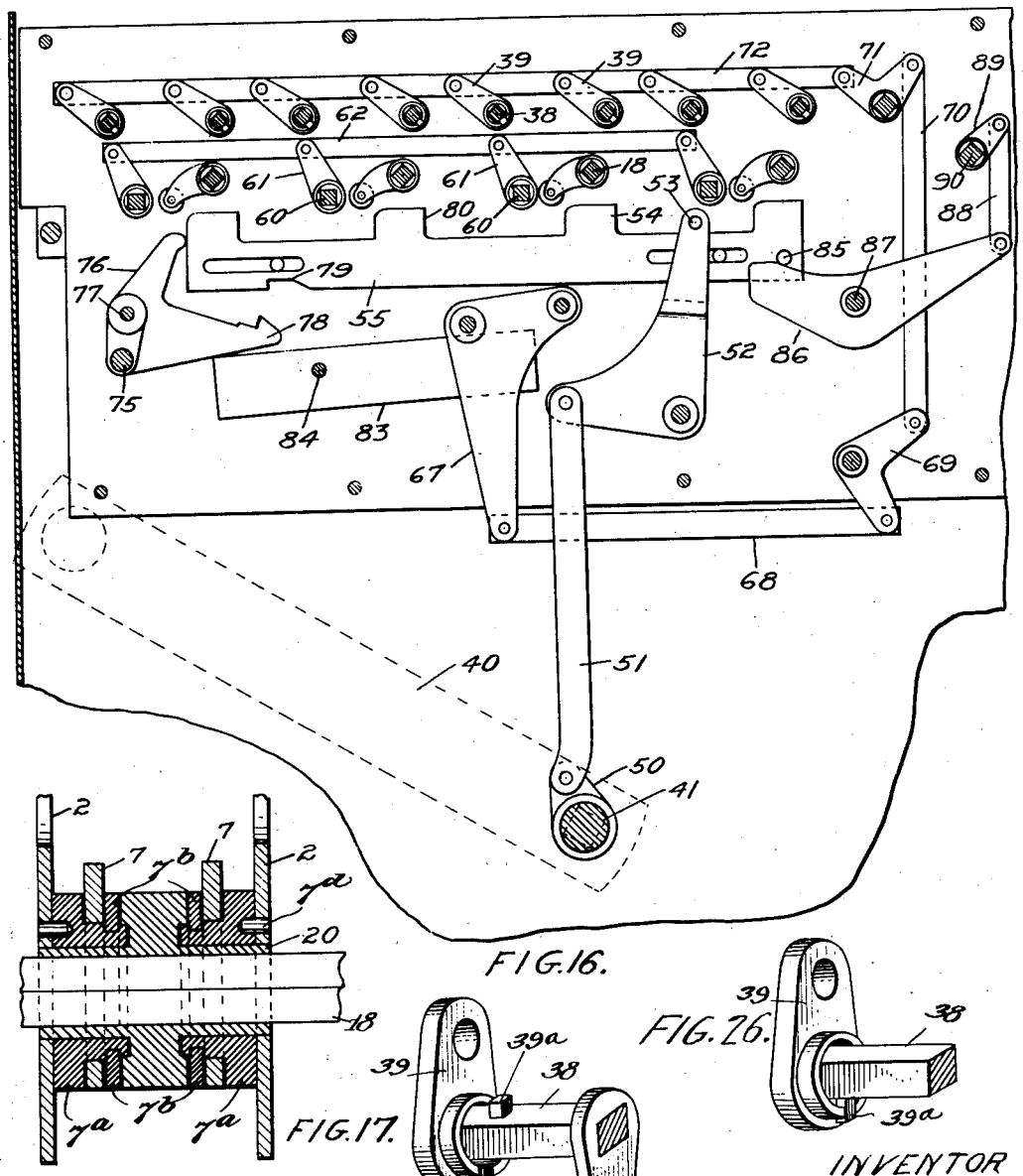

J. H. DEAN.
VOTING MACHINE.
APPLICATION FILED JUNE 20, 1910.

1,073,407.

Patented Sept. 16, 1913.

12 SHEETS—SHEET 9.

WITNESSES

INVENTOR

J. H. DEAN.
VOTING MACHINE.
APPLICATION FILED JUNE 20, 1910.

1,073,407.

Patented Sept. 16, 1913.
12 SHEETS—SHEET 11.

J. H. DEAN.
VOTING MACHINE.
APPLICATION FILED JUNE 20, 1910.

1,073,407.

Patented Sept. 16, 1913.

12 SHEETS—SHEET 12.

Witnesses

Inventor
James H. Dean
By Peirce & Fisher
Attorney

UNITED STATES PATENT OFFICE.

JAMES H. DEAN, OF CHICAGO, ILLINOIS, ASSIGNOR TO EMPIRE VOTING MACHINE COMPANY, OF JAMESTOWN, NEW YORK, A CORPORATION.

VOTING-MACHINE.

1,073,407.  Specification of Letters Patent.  Patented Sept. 16, 1913.

Application filed June 20, 1910. Serial No. 568,011.

*To all whom it may concern:*

Be it known that I, JAMES H. DEAN, a citizen of the United States, residing at Chicago, county of Cook, and State of Illinois, have invented certain new and useful Improvements in Voting-Machines, of which I do declare the following to be a full, clear, and exact description, reference being had to the accompanying drawings, forming part of this specification.

My invention relates to voting machines and seeks to provide therefor an improved straight ticket mechanism, means or mechanism to compel the voter to vote for one or more candidates before he can release himself from the machine. Means to prevent the operation of any of the party levers if keys are voted in more than one party line or would thereby be voted in more than one party line. To provide an improved ballot plate with fastenings therefor, connecting it to the body of the machine.

Figure 1:
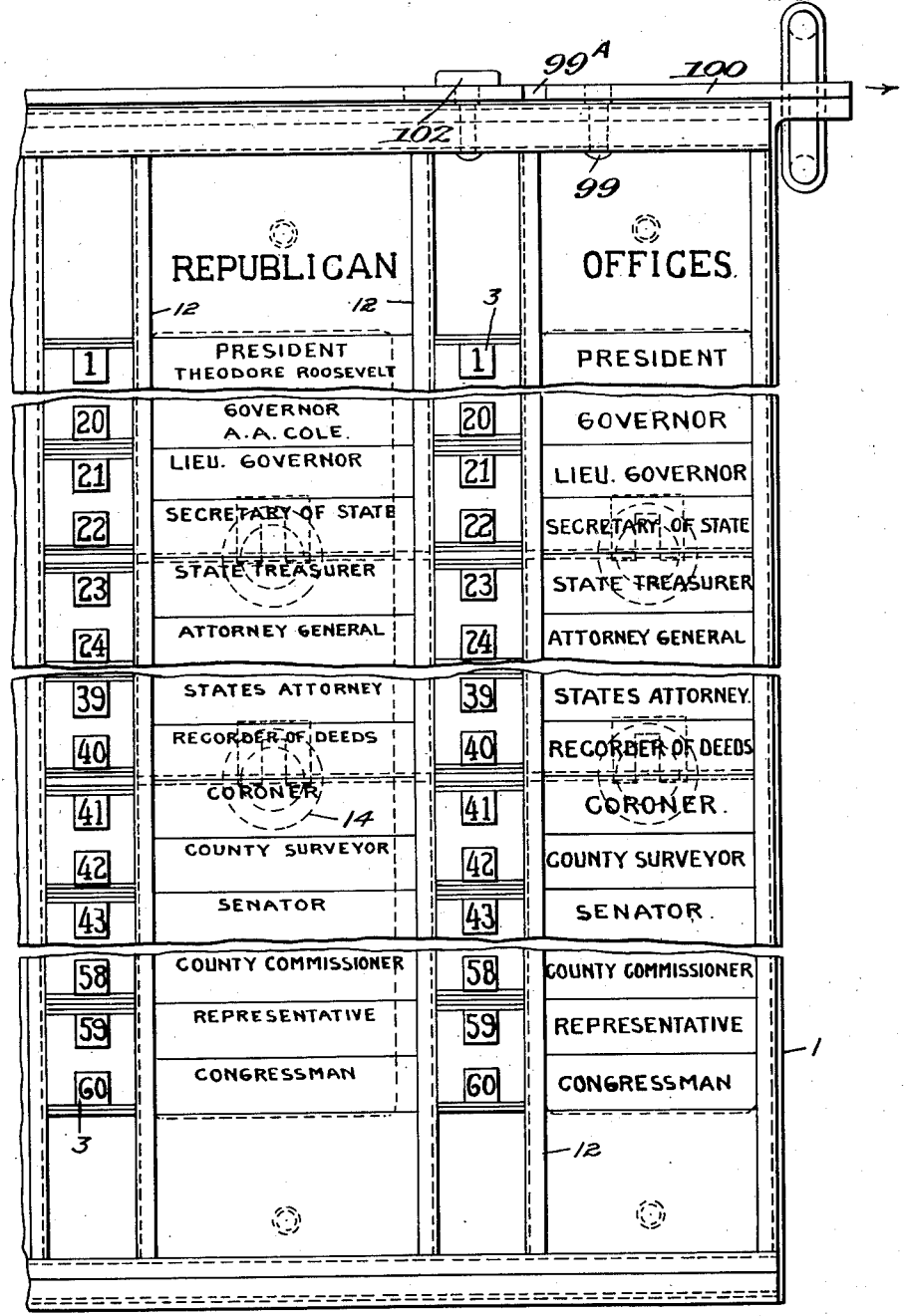
Figure 15:
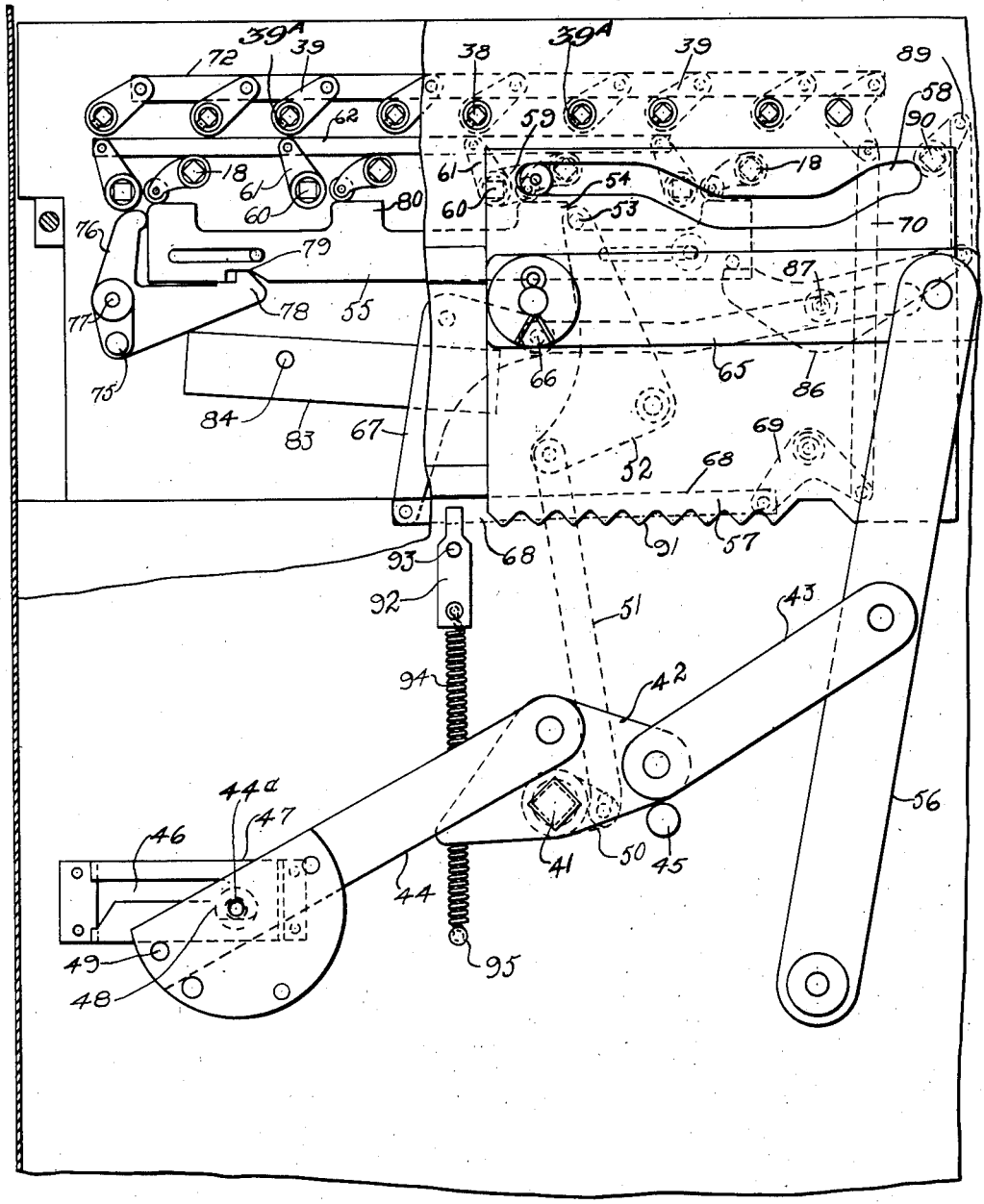
Figure 18:
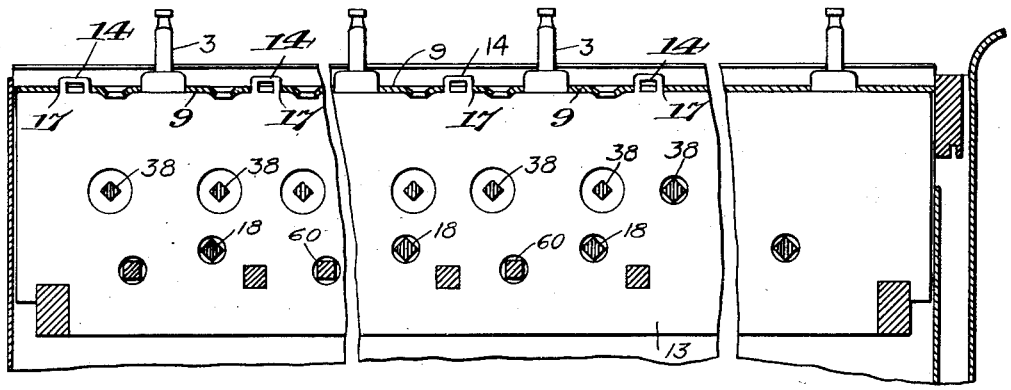
Figure 19:
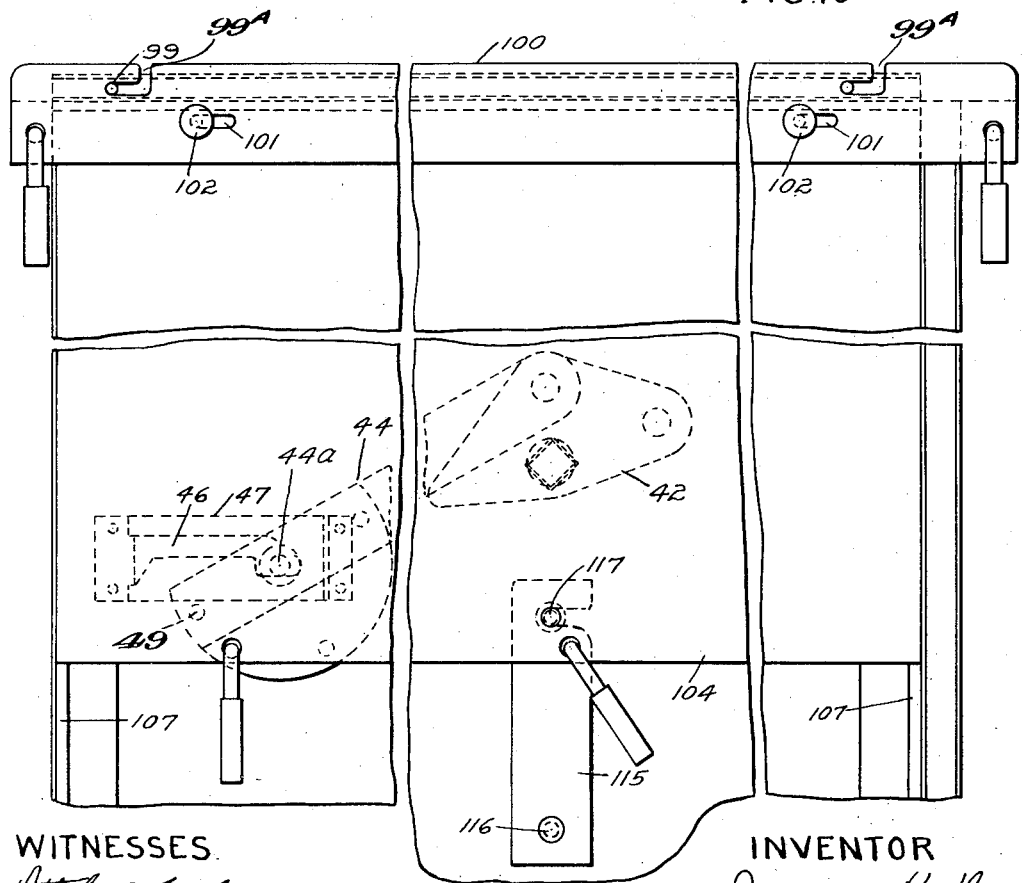
Figure 20:
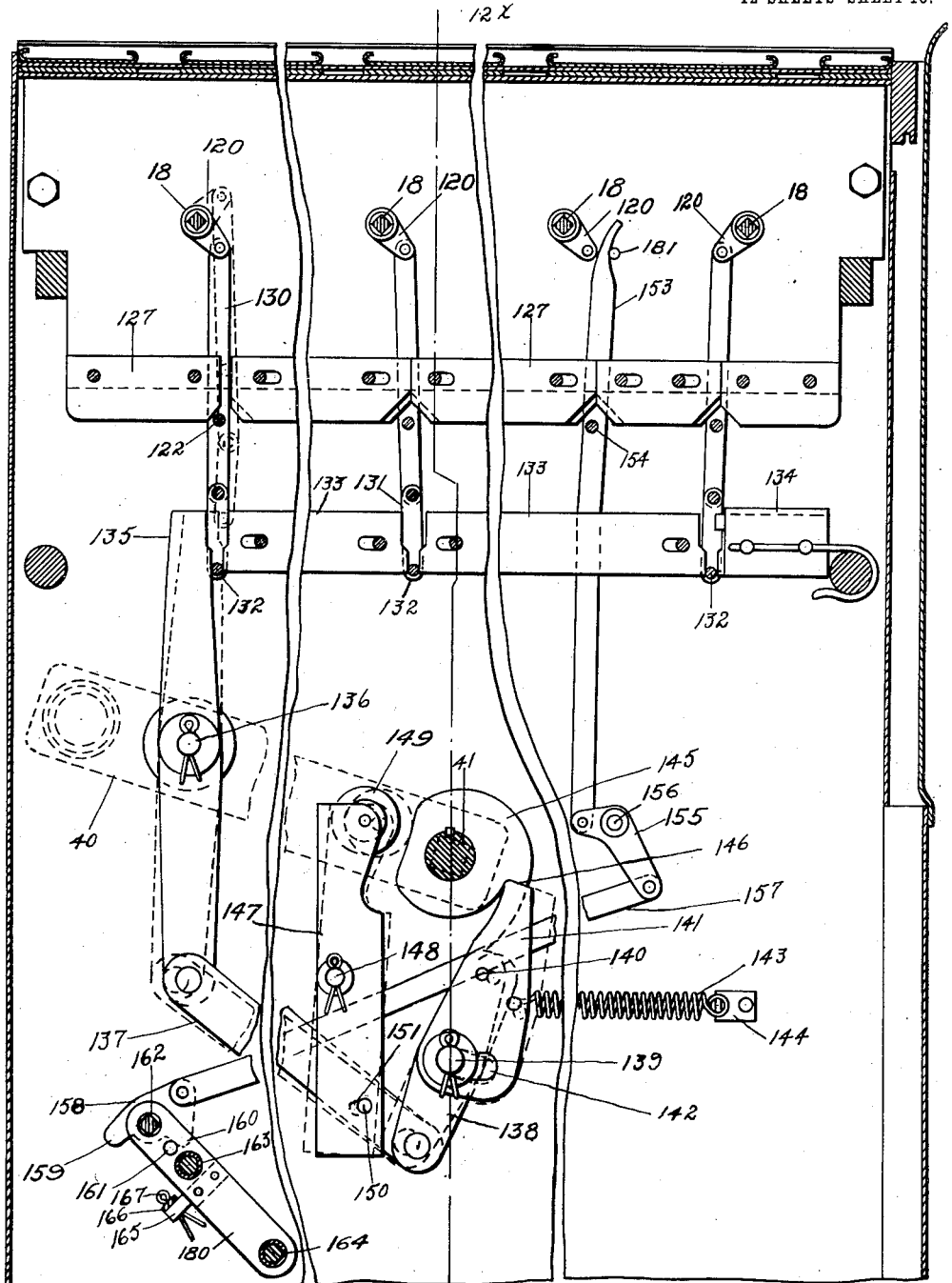
Figure 21:
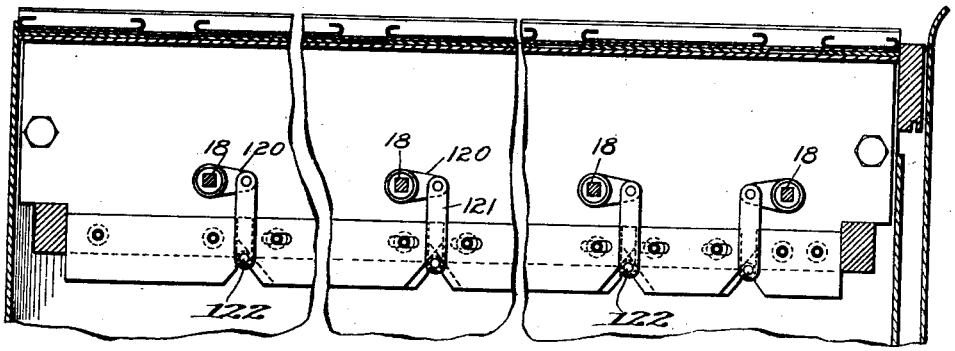
Figure 22:
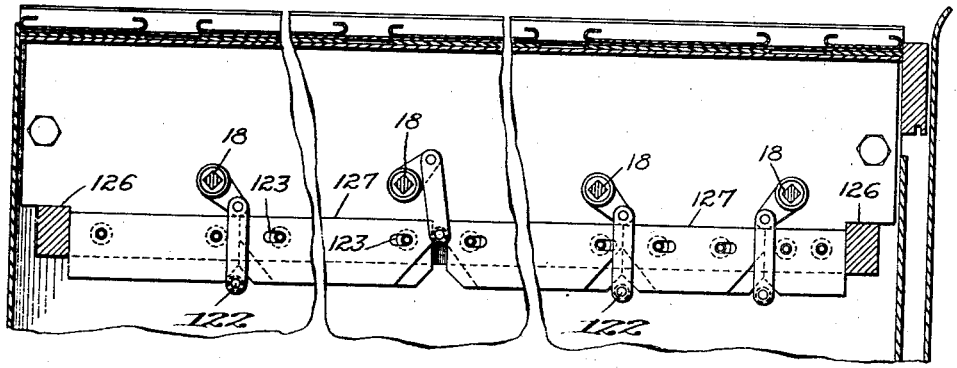
Figure 23:
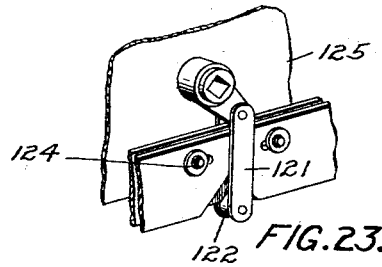
Figure 24:
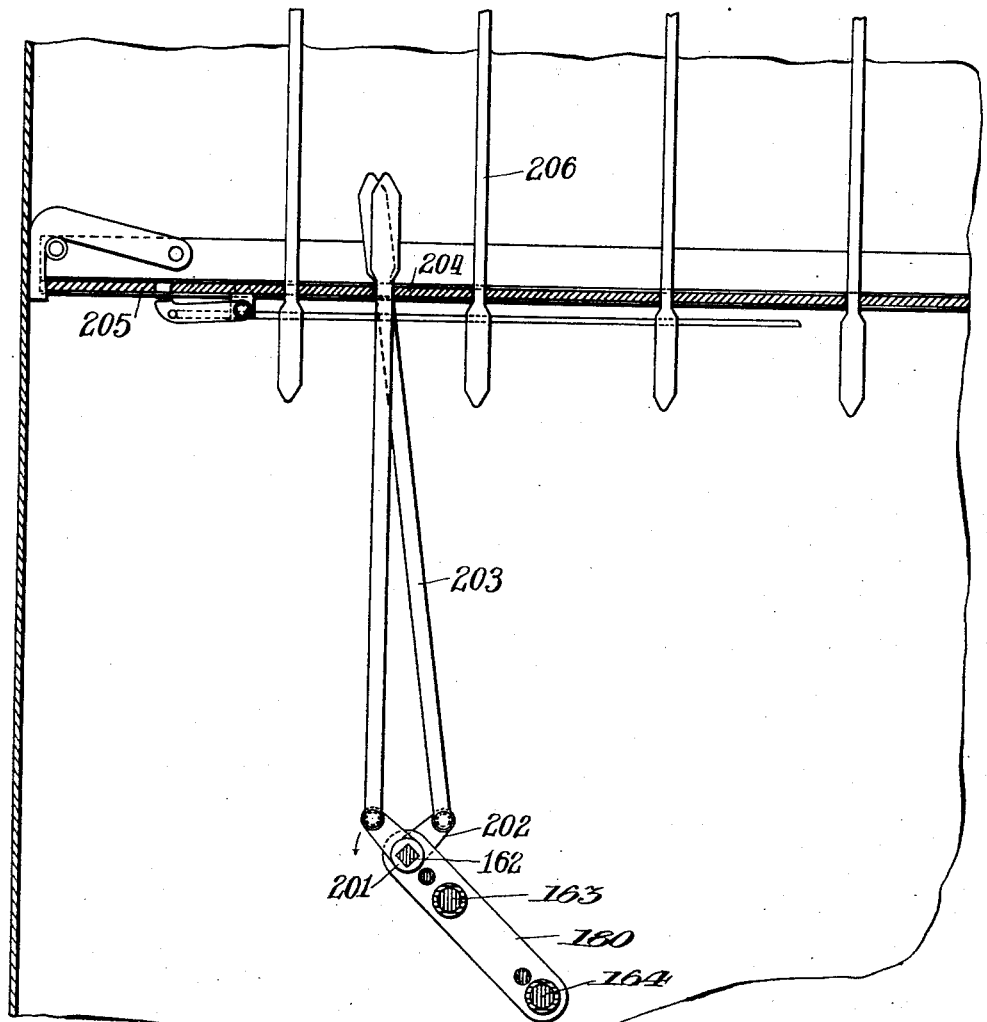
Figure 25:
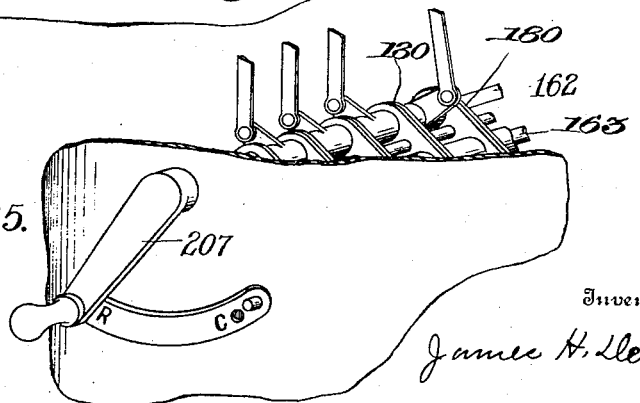

Figure 1 is a plan view of the keyboard of the machine with the ballot labels arranged thereon, parts of the keyboard being broken away in sections. Fig. 2 is a longitudinal section of the machine, partly broken away showing the keyplate and the means for holding it in position. Fig. 3 is a cross section through one of the label holders on the line $3^x$—$3^x$ of Figs. 4 and 5. Fig. 4 is a plan view of a portion of the keyboard of the machine with the ballot holder removed and the cover plate for the counters in position. Fig. 5 is a longitudinal vertical section through the machine on the line $5^x$—$5^x$ of Fig. 8, the machine being shown partly broken away. Fig. 6 is a rear elevation of the party lever as it would appear on the section line $6^x$—$6^x$ in Fig. 5. Fig. 7 is a front elevation of a portion of the end of the machine showing one of the party levers in full and another party lever cut away on the line $7^x$—$7^x$ in Fig. 5. Fig. 8 is a section on the line $8^x$—$8^x$ in Fig. 5. Fig. $8^A$ is a side elevation showing a key with its lugs and the sectional plate therefor. Fig. 9 is a section on the line $8^x$—$8^x$ in Fig. 5 with the counter-wheels and actuator removed. Fig. 10 is a longitudinal section of the rocker arm actuator on the line $10^x$—$10^x$ of Fig. 11. Fig. 11 is an end elevation of the rocker arm actuator shown in Fig. 10. Fig. 12 is a section on the line $12^x$—$12^x$ in Fig. 13. Fig. 13 is a section on the line $13^x$—$13^x$ of Fig. 12. Fig. 14 is a section of the latch controlling the operating lever partly broken away, taken on the line $14^x$—$14^x$ of Fig. 13. Fig. 15 is substantially the same as Fig. 13 showing the parts in a different position. Fig. 16 is a section on the line $16^x$—$16^x$ of Fig. 12. Fig. 17 is an enlarged section of the rocker arm actuators on the line $5^x$—$5^x$ in Fig. 8. Fig. 18 is a section on the line $18^x$—$18^x$ of Fig. 5. Fig. 19 is an elevation of the rear end of the machine. Fig. 20 is a section on the line $20^x$—$20^x$ of Fig. 12 showing the mechanism for releasing the operating lever on the operation of any of the voting devices. Fig. 21 is an end elevation of the machine partly broken away, showing the interlock between the straight ticket mechanisms. Fig. 22 is the same as Fig. 21, with the parts shown in different position. Fig. 23 is a detail view of one of the straight ticket interlocks and the interlocking blocks. Fig. 24 is a vertical transverse section through the machine showing the interlocking mechanism and the lockout operating in connection therewith. Fig. 25 is a perspective detail of a portion of the lockout mechanism. Figs. 26 and 27 are perspective views of the shaft 38 and the operating mechanism therefor for driving the counters and for resetting the counters.

In the accompanying drawings like reference numerals refer to like parts.

In the accompanying drawings reference numeral 1 refers to the voting machine made up of unit counter sections 2—2, and the parts associated therewith, each of said sections having two keys 3 therein and counters 4, substantially the same as those described in my prior application No. 238,388 and others.

Extending the length of the machine are bars 5 (see Fig. 8) on which the counter sections 2 rest, said counter sections having the corners recessed to fit on and engage with said bars 5. Each of said counter sections carries two keys 3, two counters 4, a counter actuator 6 for each of said counters and rocker arms 7 for each of said keys and dogs 8 for boosting or justifying said rocker arms 7. These parts are carried between the side plates of the counter sections which side plates are suitably fastened together by pins. The machine is built up of these sections by assembling the sections in a plurality of parallel rows. The sections are substantially alike in all particulars except that the tips or heads of the keys are numbered according to the position that such keys are to occupy in either of the rows of keys when the machine is assembled. Each of said sections contains a key of odd number and a key bearing the next consecutive even number thereafter. The sections are arranged in sequence according to the numbers on the keys so that the keys of each row will be numbered from 1 consecutively up to the highest number in the row, it being understood, of course, that all the keys in each line extending transversely to said row will bear the same number.

The counters are single axis counters of the decimal type each having three parallel wheels bearing the numbers from 0 to 9 inclusive, all of said wheels being mounted on the same axis. The wheels of the two counters in each section are placed in two rows parallel with the two keys which operate said counters the keys being placed between the counters.

A guard plate 9 is provided for the counters, said guard plate being provided with sight openings through which the counter wheels may be read. As shown in Figs. 4 and 5 this guard plate 9 has a separate sight opening for each counter wheel although it is obvious that instead of the three sight openings for each counter a single large opening may be provided instead. One of these plates 9 is provided for the counters that are placed between two rows of keys and a separate cover plate is provided for each of the outside rows of counters on either side of the machine. All of these guard plates 9 are riveted to transverse plates 10 at the end of the machine by which said plates 9 are held in a single grid.

To conceal the counters during the election I provide a cover plate 11 bearing label holders 12 thereon, one label holder for each row of keys on the machine, which label holders will carry the labels bearing the names thereon of the candidates for the various offices and an extra label holder which will carry the label containing the names of the offices to which the candidates are to be elected.

As indicated in Figs. 1 and 4 the machine illustrated in the drawings of this application is intended to have sixty keys in each row. The cover plates for the counters and the label holders will be of corresponding length. These plates are made of comparatively thin sheet metal and if made of such length and fastened only on the ends could easily be sprung up in the middle so as to permit an inspection of the counter wheels below. To prevent that I provide on the keyboard at suitable intervals and between consecutive sections, plates 13 having loops 14 on their upper edge. Each of these plates 13 extends clear across the machine and is provided with one of these loops for each row of keys. These loops 14 project above the plates of the unit sections and will occur nearly or substantially intermediate of the rows of keys. The cover plate 11 at intervals corresponding to the distribution of the loops 14 on the plates 13 is stamped with U shaped recesses 15 each having a tongue 16 therein. The guard plates 9 are also provided with recesses 17 corresponding to the loops 14 so that when the plates 9 are in position the loops 14 will project therethrough. On top of the plates 9 can be placed the cover plate 11, the plate 11 being so positioned that the broad part of the U shaped recess 15 will engage with the loop 14. By moving the plate 11 edgewise the tongue 16 on plate 11 will engage with the loop 14 thus positively holding the plate 11 down in position at such places of engagement. These places of engagement are provided frequently in each row so that it is practically impossible to spring up either of the plates 9 or 11 and thus improperly expose the counters.

The label holders 12 are swelled up at suitable intervals over the loops 14 so as to bridge over said loops where they occur leaving the label holder to lie snug against the plate 11 elsewhere.

As described in my previous applications I provide a shaft 18 for each row of keys to the end of which the straight ticket key or party lever 19 is connected. This shaft passes through the rocker arm actuators one of which rocker arm actuators 20 is provided in each unit section of the machine. Each of these rocker arm actuators has two lugs 21 thereon capable of engaging with the rocker arms 7—7 so that each of said actuators is capable of driving two rocker arms and the keys connected thereto, all of which is substantially the same as described in my prior application.

The party lever 19 is provided with a label holder 22 in which may be displayed a label bearing the name of the party to which the party lever for that election belongs. This label holder is pitched at an angle of about 45° to the shaft on which the party lever is carried making it the more easily read by the voter when he operates the party lever. It is also a part of the party lever and moves with it when the party lever is operated so that the position of the label more clearly indicates that the party lever has been operated.

The party lever 19 is provided with a pin 24 which rotates therewith. This pin engages with a curved slot 25 by the ends of which slot the oscillation of the party key is limited. This slot is cut in a washer 26 that is placed between the party lever and the casing of the voting machine and through it passes the shaft 18 on which the party lever is carried. The stud 27 is carried on the casing of the machine and is capable of engaging in either of the three holes 28, 29 or 30 in washer 26. As shown in Fig. 7 the stud 27 is in engagement with the hole 28 of the top of the washer. In this position the party lever is prevented from moving forward toward the left in the direction indicated by the arrow in Fig. 7. This is because the stud 24 can not move farther to the left in the slot 25 while the washer 26 is in the position shown in Fig. 7. Neither can the party lever move to the right because in so doing the lugs 21 carried on the shaft 18 would throw the rocker arm 7 up at the right higher than the position in which they are shown in Fig. 8 taking with them the keys 3. This however, is prevented because each key at its side carries a lug that travels in a vertical slot cut in the side of the counter section. (See Patents 938,126, 938,412 and 971,666.) In the position shown in Fig. 8ᴬ the key 3 has this lug at the top of the slot and further upward movement is thereby prevented consequently party lever 19 and the shaft 18 are locked against operation and with them is locked all the keys of that party row.

To change the setting of washer 26 I remove the cotter pin 31 from the right hand end of the shaft 18 shown in Fig. 5 which enables me to pull the shaft to the left far enough to leave the washer 26 clear of the pin 27 when the washer 26 can be rotated to engage either the hole 29 or the hole 30 with the stud 27 after which the party lever 19 and its shaft 18 can be restored to the position shown in Fig. 5 and locked in that position by the cotter pin 31. If the hole 29 is engaged with the stud 27 the party lever can be moved half of its normal travel permitting the lug 21 to move to the shoulder 32 on the rocker arm 7 as shown in Fig. 8, but no farther. This movement will not disturb the position of any of the keys. In other words the party lever can not be moved far enough to vote a straight ticket. This however permits the keys 3 to be voted individually. The voting of any one of the keys 3 will move the party lever 19 half of its normal travel rocking the shaft 18 and bringing the lugs 21 against the shoulders 32 of the rocker arms of the unvoted keys. If any additional keys are thereafter voted in that party line the position of the shaft 18 and the lugs 21 of the remaining keys will not be disturbed thereby. The party lever 19 can be moved in the reverse direction to cause the resetting of all the keys that have been placed in voted position after which any of the keys can again be placed in voted position.

If the hole 30 is placed in engagement with the pin 27 the party lever 19 with its pin 24 will be free to travel the full length of slot 25 making it possible to vote all of the keys in its party row by the operation of this lever.

As shown in Fig. 8 the weight of the key plus the weight of the rocker arm 7 on the right of the shaft 18 is frequently in excess of the weight of the rocker arm on the left of the shaft and the parts that are connected thereto. Because of this, the key can drop down a little and draw with it the parts connected thereto. To prevent this and hold the key at the extreme end of its upward movement I provide the spring 33 having the two projections 34 stamped thereon which projections engage with the collar 35 on the pin 36 and hold the key either up or down as is shown by the position of the key in Figs. 8 and 9. This engagement between the projections 34 and the collar 35 is merely yielding and does not materially interfere with the voting or resetting operation of the keys.

Each of the counter actuators 6 is provided with a square hole through which passes the square shaft 38 by the oscillation of which shaft the counter actuators are oscillated and the counters are driven. As indicated in Fig. 8 two of these shafts 38 are provided for each row of keys one of which shafts drives the actuators of the counters of the odd numbered keys and the other of these shafts drives the actuators of the counters of the even numbered keys. These shafts are operated by the cranks 39 shown in Fig. 13 each of which cranks is provided with a hub. Each of these hubs is recessed to provide for the engagement therewith of a pin 39ᵃ on the actuator shaft 38. By moving any of the shafts 38 endwise to the right from the position shown in Fig. 5, this pin 39ᵃ is disengaged from its hub allowing the shaft to rotate freely within the hub. This endwise movement of the shaft 38 is permitted only when the plate 104 is removed. The removal of this plate 104 will presently be described. The hole through the hub is round and large and provides sufficient clearance between the hub and the shaft to permit the independent rotation of the shaft. While the shaft 38 is in this position it can be turned continuously in either direction. If the keys are placed in voted position the counters will be turned either forward or back by the rotation of the shafts 38. By turning the counters continuously in one direction until 000 appears through the sight openings the counters may be reset and the further movement of any of the counters may then be stopped by placing their respective keys in unvoted position. By observing each counter as it comes to 000 and resetting its key when it reaches that point all the counters connected with shaft 38 may be reset. The further rotation of the shaft has no effect on the counters. The shaft 38 may then be connected with its driving crank 39 so that it will be thereafter operated thereby. In like manner the other shafts 38 may be operated to reset their counters so that all of the counters on the machine may be reset in this manner.

To secure the operation of the counter and the operation of the machine otherwise I provide the operating lever 40 shown in Figs. 12 and 16. This lever is keyed to the main operating shaft 41 of the machine. Keyed to this shaft is the plate 42 (see Figs. 13 and 15) having the links 43 and 44 pivotally connected thereto. On the casing of the machine is the stud 45 which limits the rotation of the plate 42 and its shaft in one direction. The link 44 carries a stud 44ª thereon which travels in the horizontal slot 46 formed in a bracket 47 carried on the side of the machine. The lower side of this slot has a shoulder 48 therein against which the stud 44ª stops when the parts are in the position shown by Fig. 15 preventing the movement of the link 44 to the left and the parts connected therewith. The link 44 thus forms a latch preventing the oscillation of the lever 40 and the shaft 41 until the latch 44 is lifted to clear the stud 44ª from the shoulder 48. To permit this to be readily done by the election officers a string may be connected to the link 44 at the hole 49 although it is obvious that the latch can be lifted by hand. The latch 44 is shown partly exposed below the plate 104 in Fig. 19. This makes it accessible so that it can be lifted by hand.

While the latch 44 is in position shown in Fig. 15 the machine is locked against voting. The operating lever 40 of the machine can not be moved until the latch is lifted by the election officer. After the latch has been lifted the operating lever can be moved to oscillate the shaft 41 and set the parts in the position shown in Fig. 13 and the machine can then be operated by the voters. When the shaft 41 is moved from the position shown in Fig. 15, the crank 50 moves with it to lift the link 51 and rock the bell crank 52 to the right disengaging the stud 53 from the shoulder 54 on the sliding bar 55. The rocking of the shaft 41 also rocks the plate 42 moving the link 43 to the left and rocking the lever 56. Connected to this lever 56 is a cam plate 57 which moves to the left with it. In this cam plate is a cam groove 58 with which engages the crank 59 mounted on the shaft 60. On this shaft 60 is crank 61 to which is connected the connecting bar 62 which in turn is connected to similar cranks 61 mounted on similar shafts 60. The moving of the cam plate 57 to the left causes the rocking of the shaft 60 first in one direction and then in the other. On these shafts 60 are carried by dogs 8 shown in Figs. 8 and 9. The first part of the cam 58 causes the dogs 8 to move from the position shown in Fig. 8 to that shown in Fig. 9. The dogs are held in this position during the movement of the idle part of the cam past the end of the crank 59 after which they are raised again to the position shown in Fig. 8 by the remaining part of the cam. At the same time another cam 65 engages with the stud 66 carried on the bell crank 67 and causes said bell crank to rock moving the bar 68 to the right from the position shown in Fig. 15 to that shown in Figs. 13 and 16. This rocks the bell crank 69 moving the link 70 up rocking the bell crank 71 and with it the connecting rod 72. To this connecting rod 72 are connected the cranks 39 which drive the shafts 38 and the counter actuators of the machine. It will be seen that the oscillation of the counter actuators is delayed until after the movement of the dogs 8 has begun and is not completed until about the time the movement of the dogs 8 has been completed in the reverse direction.

By the movement of the bell crank 52 to the position shown in Fig. 13 the bar 55 is unlocked and the bar is further released by the cam plate 57 striking against the stud 75 which rocks the latch 76 around the pivot 77 drawing the latch 78 down out of the recess 79 in the bar 55. The latch 76 is in the form of a bell crank having the hook 78 at the end of the horizontal arm and having the upright arm bearing against the end of the bar 55. As the cam plate 57 rocks the latch 76 it causes it to push the bar 55 forward taking the lugs 80 out from under the cranks 81 which cranks are carried on the ends of the shafts 18 which shafts are then free to be operated by the voting of the individual keys or the party levers as heretofore described. When the parts are moved in the reverse direction by the movement of the operating lever 40 the bell crank 52 rocks and carries the bar 55 back to the position shown in Fig. 15. The hook 78 is then carried up into engagement with the recess 79 by the lever 83 pivoted at 84 the short end of which bears against the horizontal arm of the latch 76 and the long end of which is free to drop by gravity, and in so dropping it raises the short end of the lever 83 and with it the latch 76 locking the bar 55 again in position. Carried on the right hand end of the bar 55 is the stud 85 which bears against one end of the lever 86 pivoted at 87. To the other end of this lever 86 is connected the link 88 which in turn is attached to the crank 89 keyed to the shaft 90 by which the printer sections are operated. The printer sections referred to are substantially the same as those illustrated in Fig. 2 of Patent 971,666 and Fig. 7 of Patent 938,126. When the bar 55 is in the position shown in Fig. 16 this shaft 90 is locked against operation. When the bar 55 is in the position shown in Fig. 13 the lever 86 can be rocked moving the bar 55 still farther to the right. The bar 55 will also be moved farther to the right by the operation of any of the shafts 18 by the straight ticket keys or the individual keys. This movement of the bar 55 releases the mechanism controlled by the printer shaft 90 so that it can be operated. The printer shaft 90 with the mechanism controlled thereby will be restored to the position shown in Fig. 15 by the operation of the bar 55 to the right causing the stud 85 to react on the cam cut in the upper edge of the lever 86 rocking the lever 86 and with it the shaft 89. On the bottom of the cam plate 57 I cut the teeth 91 with which can engage the dog 92 pivoted at 93 constituting thereby a full stroke mechanism which prevents the operation of the cam plate 57 in the reverse direction until the plate has gone the full distance in which it has been started. This dog 92 is held up to engagement with the cam plate 57 by the tension spring 94 which is connected at one end with the dog 92 and at the lower end with the stud 95 on the casing of the machine.

The guard plates and the ballot label holders are fastened in position by a construction which I will now describe:

As previously described the guard plates 9 immediately above the counter wheels are provided with sight openings through which the counters may be observed. The sight openings consist of rectangular slots punched through the sheet metal plate. The metal strips left between the sight openings are bent down so as to leave less clearance between them and the intervals between the wheels of the counter as appears at the upper left hand corner of Fig. 5. As previously explained all of the guard plates 9 on the machine are riveted to the cross plates 10. At one end this cross plate 10 is curled up for a purpose that will presently appear. Other cover plates 11 are provided as heretofore described one for the two rows of counters between the consecutive rows of keys. On top of these is placed the label holders 12 there being one label holder for each row of keys and one or more additional. These label holders are fastened at the ends to cross plates 97. The plates 97 are curled up at both ends around rods for the purpose of reinforcing and stiffening them. At one end the rod 98 is provided with pins 99 that pass through and engage with the plate 100. The plate 100 engages with the studs 99 by right angle slots shown in Fig. 19 by which the plate can be readily engaged with the studs 99 or disengaged therefrom. The bar 100 is limited to a longitudinal movement by the slots 101 engaging with the studs 102, which studs are riveted into the angle iron 103, which in turn is riveted to the rear door 104. On the door 104 are carried the studs 105 having large heads capable of engaging with the studs 106 on the corner angles 107 of the machine. The label holders can be removed from the machine by moving the plate 100 to the left from the position shown in Fig. 19, or to the right from the position shown at the top of Fig. 1. This brings the vertical slots 99$^a$ in the bar 100, as shown in Figs. 1 and 19, into line with the pins 99 on the bar 98, as shown in Figs. 1, 5 and 19, after which the label holders and the cross plate 97 as shown in Fig. 5, may be swung up at the right around the far end as the center and then moved to the right out of engagement with the upturned end of the plate 10 as shown at the left in Fig. 5, and removed from the machine. The upturned end 9 of the plate 10 acts as a hook with which the left hand end of the label holder frame engages and by which it is held down at the left end and at its right hand end it is held down by the pins 99. When the label has been released at the right hand end as shown in Fig. 5, it can be swung up about 30° and then moved a half inch or so to the right which will release it at the left end after which it can be removed. The plate 9 with the cross plate 10 is held in position at one end as follows: Riveted to the inner side of plate 10 are the brackets 109 having the holes 110 therein. At suitable intervals riveted in the casing of the machine are the studs 111. The brackets 109 occur adjacent to the studs 111 when the cover plate is in position. The rod 112 is passed through the machine passing through the openings 110 in the brackets 109 and passing below the studs 111 and securely fastens the plates 9 and 11 in position at that end. At the other end they are held in position by the angle iron 103 one side of which is left long to engage with the plate 9 at that end. The end door 104 and the angle iron 103 and the parts connected thereto are held in position by the studs 105 at the top as above described and by the hook 115 pivoted at 116 on the machine casing which hook engages with the stud 117 on the door 104, see Fig. 19.

In Figs. 20, 21, 22 and 23, I have shown mechanism whereby I prevent the possibility of more than one straight ticket key being left in voted position at a time and whereby I also prevent the possibility of operating any of the straight ticket keys when the keys in more than one party row have been operated. To secure this result I provide on the ends of the rock shafts 18, cranks 120, to which are connected a pair of links 121, between which links at their lower ends is carried a pin 122. The links 121 in each pair are spaced apart by the thickness of the crank 120, and between these links 121 thus spaced apart are placed the ends of interlocking blocks 127 arranged in two sets. These interlocking blocks 127 are rectangular in shape, and each of the blocks has one corner of its lower side cut with a short bevel and the other corner of its lower side cut with a long bevel. Each of the blocks 127 is also perforated with slots 123 through which pass studs 124 mounted on the plate 125, on which studs the blocks 127 are mounted to slide with a limited movement. The blocks each are of a length somewhat less than the distance between centers of consecutive shafts 18. The blocks 127 of one series are placed on the studs 123 with the long bevels at the left of the block, while the blocks of the second series are all placed on the studs with the long bevels at the right of the blocks. The joints between consecutive blocks of one series coincide substantially with the joints of adjacent blocks in the other series. In each series it will be seen that the end of the block having the long bevel is adjacent to the end of the next block having the short bevel, and that when the blocks abut the long bevels of the blocks in one series can overlap the long bevels of adjacent blocks in the other series.

In Fig. 22, three of the rock shafts 18 are shown in normal or reset position. In Fig. 21, all four of the shafts 18 are shown in the position which they must occupy if a key is voted in each of the party rows represented thereby. In Fig. 22 one of the shafts 18 is shown in the position which it will occupy when its party lever has been operated. It will be seen from the position of the blocks in Fig. 22 that when one of the shafts 18 has been moved to the position shown therein the contiguous blocks of both series will be separated to an amount equal to the diameter of the pin 122. This moves all of the blocks to the right or left to the extent permitted by the slots 123, or to the extent permitted by the end abutments 126, and while in such position none of the other shafts 18 can be rocked from the position in which such shafts are shown in Fig. 22. If, however, one of the shafts is moved to the position shown in Fig. 21, the blocks in neither series will be necessarily separated. The blocks of one series, however, will be moved to the right, or the blocks of the other series to the left so that their joints will not coincide, and while the blocks are in such position all of the shafts 18 may be placed in the position shown in Fig. 21, it being apparent that the blocks in each series may remain in abutment with each other, but that the joints between adjacent blocks of the two series will remain out of line with each other. This will permit each of the pins 122 to advance to the position shown in Fig. 21, but if any two of such pins have reached such position neither one of them can advance beyond that until the other is fully withdrawn, and when either of the pins 122 has been advanced to the position shown in the one case in Fig. 22, all of the other shafts 18 will be locked against rotation, and with them all the keys controlled thereby will be locked against voting operation. In this way the voting of a split ticket is permitted but the voting of two party levers simultaneously is prevented, as is also prevented the possibility of leaving two of such party levers in voted position.

In Fig. 20 I have shown a construction whereby the voter is prevented from operating the lever 40 until a key has been voted. Each of the shafts 18 is provided with a crank 120 to which is connected a link 130. Each of these links is provided with a stud 122 similar to that shown in Fig. 23, which interlocks with the blocks 127 to prevent the operation of more than one of the party levers, as previously explained. Pivoted to the lower end of each of the links 130 are pendants 131, which pendants carry at their lower ends studs 132. These studs are normally in engagement with the blocks 133, between consecutive ones of said blocks said studs are positioned, spacing the blocks apart. At the right hand end of the series of blocks 133 is the stationary block 134, and at the left hand end of the series is the lever 135 pivoted on the stud 136. The lever 135 has connected to it at its lower end the link 137, which link in turn connects to the lever 138 pivoted on the stud 139. Pivoted on the upper end of the lever 138 at 140 is the latch 141. This latch has at its lower end a segmental slot 142 which engages with the stud 139, and by means of which its rotation around its pivot 140 is limited. Connected to the latch 141 is the spring 143, the other end of which is connected to the bracket 144 mounted on the end plate of the machine. By means of this spring 143 the upper end of the latch is always pressed to the left so as to engage with the plate 145 carried on the shaft 41 which plate is provided with a shoulder 146. When one of the shafts 18 is rocked the pin 132 is drawn up from between the lever 135 and its adjacent block 133 or from between adjacent blocks 133. The tension of the spring 143 causes the upper part of the lever 138 to rock to the right and the link 137 to move to the left, causing the upper part of the lever 135 to rock to the right in turn. This permits the upper end of the latch 141 to escape from contact with the shoulder 146 and permits the shaft 41 to be moved in the reverse direction or in the direction necessary to count the vote and reset and lock the keys. The latch 141 is shown to be pivoted on the lever 138 so as to be rocked independently thereof. This independent movement of the latch 141 is necessary when the lever 40 is being moved to the position shown in Fig. 20, as the shoulder 146 can then pass by the latch 141, the latch yielding to permit it and passing in behind the shoulder when the lever reaches the position shown in Fig. 20. During this movement the latch 141 is held up to engagement with the plate 145 by the spring 143. I also provide the lever 147 pivoted on the stud 148 which carries at its upper end the anti-friction roller 149. This roller normally bears against the plate 145, which plate is cam shaped for a purpose as will now appear. As the shaft 41 rotates, the cam plate 145 rocks the lever 147 to the left at the top. The lever 147 at the bottom engages with a link 137 by means of a pin 150 carried on the lever 147, engaging with a slot 151 in the link 137. This causes the link 137 to move to the right and causes the lever 135 to move to the left at the top. This removes all obstruction from the pins 132 when such pins must return to the position shown in Fig. 20 by being shoved down between the blocks, otherwise the blocks would obstruct their return and make the movement of such parts somewhat heavier.

In Figs. 20, 24 and 25 I have shown the lockout mechanism that I use in my improved machine. Mounted in the bottom of the machine is a frame carrying the lockout. This frame comprises the bars 163 and 164 extending the full length of the machine. Placed on these bars alternately are plates 180 arranged in pairs with collars between consecutive pairs of plates spacing them apart a distance between centers equal to the distance between centers of office lines of keys. The upper end of each plate is perforated to receive the hubs or sleeves 201 with the cranks 202 thereon. Each of these sleeves is formed with reduced ends which engage with the perforations in the plates 180 so as to be free to rotate therein. Each of the sleeves is perforated with a square hole so that through all the sleeves may be passed the square shaft 162. The sleeves and the cranks are placed on said shaft in either of the two positions both of which are illustrated in Figs. 24 and 25. Connected to each of the cranks 202 are the interlocking wedges 203 which extend upward and engage with the blocks 204 carried in the channel 205 interlocking with said blocks and the interlocking wedges 206 connected to the keys such as are shown in Figs. 8 and 9. In the end of the shaft 162 is placed a handle 207 for rotating the shaft. On the shaft is also placed the dog 158 having lugs 159 and 160 thereon capable of engaging with the stud 161 mounted on the end plate 180 of the frame to limit the rotation of the shaft to a quarter turn. When the cranks 202 are set corresponding to the position of that shown at the left of the shaft 162 as shown in Fig. 24, the rotation of the shaft in the direction indicated by the arrow will draw down the interlocking wedge attached thereto taking up the space in the interlocking channel and locking out of operation the keys controlled by the interlocking mechanism of those channels. Where the cranks 202 are turned to the right as shown in Fig. 24, the turning of the shaft 162 in the direction indicated by the arrow will cause the wedge 203 to rise and fall idly without affecting the interlock and the office lines associated therewith will be left free to operate and the other office lines will be locked against operation. The sleeves 201 can be placed in either of these positions by drawing out the shaft 162 placing the sleeves each in the desired position and then again inserting the shaft 162. Connected to the dog 158 is the link 157. This link in turn connects to one arm of the bell crank 155 pivoted on the stud 156. The other arm of this bell crank is connected to the stem 153 having a stud 154 capable of engaging with the blocks 127 for the purpose of placing them in the position shown in Fig. 21 and locking the straight ticket shafts as heretofore described. The stem 153 terminates in a wedge that passes between the stud 181 and the crank 120. When the stem 153 is raised by the rocking of the shaft 162 in the direction indicated by the arrow in Fig. 24, the rocking of the shaft 18 engaged thereby is prevented thus locking out of operation the keys controlled thereby. If the "yes" and "no" keys are controlled by this shaft 18, such keys can be locked bodily against operation at the same time as selected office lines of keys are locked.

In Figs. 10, 11, and 17 I have shown an improved form of mount for the rocker arms. This consists of a hub or sleeve 20 such as is shown in Figs. 10 and 11 consisting of a central tube with a collar formed around said tube with a plate formed on said collar forming the lugs 21, 21. An annular groove is formed on each side of the collar as shown in Fig. 10. Collars 7a are provided each having an opening therein capable of engaging with the central tube of the hub 20. This collar is turned down at one side to give a bearing to the rocker arm which is carried thereon. When the rocker arm 7 is placed in position on the collar, a washer 7b is placed on the collar as well. The metal on the end of the collar is spun up around the washer securely holding it in place. Two of these collars are placed on the hub after which the hub is placed between the plates 2—2. The collars are prevented from turning by the studs 7d which engage with both the collars and the plates.

The rocker arm 7 has at its right hand end, a notch cut therein with which the point of the dog 8 will engage when the parts are in the position shown in Fig. 9. If pressure is applied to the key to reset it while the dog 8 remains in this position, the force will be transmitted to the dog, not on the corner of it but to the sides on either side of the corner. In this way the corner of the dog is protected against becoming blunt, which if it happened might cause the dog 8 at some future time to become dead centered on the tip of the rocker arm 7.

Having thus described my invention, what I claim as new and patentable is as follows:

1. The combination in a voting machine of keys arranged in parallel rows, counters arranged between said rows of keys and on either side thereof, a cover plate for said counters having a single slot therein for each row of keys, means for rigidly and detachably fastening said cover plate with reference to the counters at points between said rows of keys.

2. The combination in a voting machine of keys arranged in parallel rows, counters arranged between said rows of keys and on either side thereof, a cover plate for said counters having a single slot therein for each row of keys, a plate extending across said rows of keys having loops formed on the top thereof, said cover plate having tongues formed therein capable of engaging with said loops by a sliding engagement.

3. The combination in a voting machine of a row of counters, a cover plate therefor, a plate extending across said row of counters having a loop formed in the top thereof, a tongue in said cover plate for engaging said loop.

4. The combination in a voting machine of counters arranged in rows, a cover plate for said counters, said cover plate comprising a series of narrow plates extending beyond said counters at each end, a plate extending transversely of said plates at each end to which said plates are attached.

5. The combination in a voting machine of a casing, an operating shaft mounted in said casing, a plate rigidly mounted on said shaft, a stud mounted on said casing to limit the oscillation of said shaft through said plate, a latch pivoted to said plate having a stud thereon, a bracket having a slot therein with which said stud engages and in which said stud travels back and forth with the oscillation of the shaft, a shoulder on said slot to engage with said stud and lock the shaft against operation.

6. The combination in a voting machine of a casing, voting devices mounted therein, an operating shaft for said machine mounted in said casing, means to prevent the operation of said shaft until one of said voting keys has been operated.

7. The combination in a voting machine of a casing, keys mounted therein, an operating shaft for said machine mounted in said casing, a latch to prevent the operation of said shaft, means whereby the operation of any of said keys will release said latch.

8. The combination in a voting machine of a casing, keys mounted therein, in rows, an operating shaft for said machine mounted in said casing, a latch to prevent the operation of said shaft, a rock shaft mounted parallel to each of said row of keys, connections between each of said keys and its particular shaft whereby the operation of any of said keys will rock said shaft, a crank on the end of said shaft, a link pivoted thereto carrying a stud thereon, interlocking blocks between which said studs are normally positioned, a spring pressed lever pressing said studs and interlocking blocks together, the voting movement of any of said keys causing its shaft to move and withdraw the stud connected thereto from between the interlocking blocks, permitting said lever to move and withdraw the latch from contact with said operating shaft.

9. The combination in a voting machine of a row of keys, a shaft arranged parallel to said row of keys, connections between said shaft and said keys whereby the oscillation of the shaft will operate the keys, a lever for oscillating said shaft, a recessed washer with which said lever engages, said washer being capable of being rigidly mounted on said machine in either one of several positions, in one of which positions said washer will lock said shaft and its lever against oscillation, and in another position it will permit a partial oscillation of said shaft, and in another position will permit a full oscillation of said shaft.

10. In a voting machine the combination of a party key, a stud thereon, a non-rotatable washer adjacent to said key with which said stud engages to limit the movement of the key, said washer being adjustable to either of three positions, to either lock said key against operation, or permit a partial or complete operation thereof.

11. In a voting machine a washer having a hole central thereof, a segmental slot on one side of said hole and a plurality of independent perforations on the other side of said hole.

12. In a voting machine the combination of a party key, a stud thereon, a plate with a slot therein with which said stud engages to limit the movement of said key.

13. In a voting machine the combination of a key, a rocker arm connected thereto, a stationary sleeve on which said rocker arm is rotatably mounted, an actuator engaging with said rocker arm to cause or limit the oscillation thereof.

14 The combination in a voting machine of a key, a spring attached thereto, an abutment against which said spring normally bears, rounded projections on said spring, one or the other of said projections engaging with said abutment when the key is at either end of its movement to yieldingly hold the key in position.

15. The combination in a voting machine of keys, rock shaft, connections between said rock shaft and said keys for resetting the keys, a sliding bar for operating said rock shaft, a bell crank for operating said sliding bar, an operating shaft for the machine having a crank thereon and a link connecting said bell crank for operating said sliding bar.

16. The combination in a voting machine of keys, rock shaft, connections between said rock shaft and said keys for resetting the keys, a sliding bar for operating said rock shaft, a bell crank for operating said sliding bar, an operating shaft for the machine having a crank thereon and a link connecting said bell crank for operating said sliding bar, a latch positively driven into locking engagement with the bar by the endwise movement of the bar.

17. The combination in a voting machine of an operating shaft for the machine, a crank thereon, a link connected to said crank, a bell crank connected to and rocked by said link, a sliding bar operated by said bell crank, a latch positively driven into locking engagement with the bar by the endwise movement of the bar.

18. The combination in a voting machine of an operating shaft for the machine, a crank thereon, a link connected to said crank, a bell crank connected to and rocked by said link, a sliding bar operated by said bell crank, a latch positively driven into locking engagement with the bar by the endwise movement of the bar, a stud on said latch, a sliding plate mounted on the machine and operated by said shaft to engage with said stud to trip said latch and release said bar.

19. The combination in a voting machine of an operating shaft for the machine, a crank thereon, a link connected to said crank, a bell crank connected to and rocked by said link, a sliding bar operated by said bell crank, a latch positively driven into locking engagement with the bar by the endwise movement of the bar, a stud on said latch, a sliding plate mounted on the machine and operated by said shaft to engage said stud to trip said latch and release said bar and move the bar in the reverse direction.

20. In a voting machine the combination of a plurality of rock shafts, interlocking pendants connected to said rock shafts, a double series of interlocking blocks with which said pendants engage, each of said shafts being capable of a half or full movement, a half movement of any of said shafts causing the blocks of one series to be moved relative to the blocks of the other series without interfering with the half movement of the remaining shafts, a full movement of any of the shafts causing the blocks of each series to be separated and preventing the movement of any of the remaining shafts.

21. The combination in a voting machine of a lockout comprising a square shaft, sleeves mounted thereon, cranks on said sleeves and interlocking wedges connected thereto, said wedges being moved endwise by the rocking of said shaft.

22. The combination in a voting machine of a lockout comprising a row of sleeves independently and adjustably mounted, a square shaft for engaging said sleeves and rock them, each of said sleeves being capable of engaging said shafts in a plurality of angular positions.

23. The combination in a voting machine of a lockout comprising a frame made up of parallel plates, recesses in said plates, sleeves with reduced ends engaging with said recesses to oscillate therein.

24. The combination in a voting machine of a lockout comprising a series of sleeves, a shaft on which said sleeves are splined and capable of angular adjustment thereon to a plurality of positions, interlocking wedges attached to said sleeves, said wedges being idly reciprocated by the sleeves in one position on said shaft, when said shaft is turned a limited amount in one direction the wedges attached to sleeves in another position being advanced to interlocking position.

25. The combination in a voting machine of a lockout comprising a series of sleeves, a shaft on which said sleeves are splined and capable of angular adjustment thereon to a plurality of positions, interlocking wedges attached to said sleeves, said wedges being idly reciprocated by the sleeves in one position on said shaft, when said shaft is turned a limited amount in one direction the wedges attached to sleeves in another position being advanced to interlocking position, said sleeves being adjustable from one position to another, when the shaft is withdrawn and being locked in either position by the insertion of the shaft.

26. A voting machine lockout comprising a shaft, a series of interlocking wedges connected thereto for locking out the machine by office lines, a plurality of operating shafts in said machine, interlocking mechanisms operated by said lockout to lock one of said shafts against movement and limit the movement of the other shafts.

27. A voting machine comprising keys arranged in office lines, party keys for said machine, a lockout having means for locking selected office lines of keys and having separate means for locking the party keys against voting movement.

28. An interlocking block having a rectangular shape having one corner beveled with a short bevel and an adjacent corner beveled with a long bevel.

29. A series of interlocking blocks, each of said blocks having a rectangular shape having one corner beveled with a short bevel and an adjacent corner beveled with a long bevel.

30. The combination in a voting machine of keys arranged in party lines and office rows, party levers for operating the keys of each party line, "yes" and "no" voting devices, a lockout mechanism for locking out said keys by office lines, said lockout means when operated serving to lock the party levers against voting operation and lock the "yes" and "no" voting mechanisms.

31. The combination in a voting machine of a rocker arm having a recess therein and having a pointed tip thereon, a dog for engaging with said rocker arm on either side of said pointed tip, said dog normally acting to depress said rocker arm until the point thereof engages in said recess.

JAMES H. DEAN.

Witnesses:
HARRY L. CLAPP,
KATHARINE GERLACH.